(12) United States Patent
Nerowski et al.

(10) Patent No.: US 10,718,646 B2
(45) Date of Patent: Jul. 21, 2020

(54) ULTRASOUND FLOW MEASUREMENT APPARATUS AND METHOD FOR DETERMINING THE FLOW RATE

(71) Applicant: SICK ENGINEERING GMBH, Ottendorf-Okrilla (DE)

(72) Inventors: Alexander Nerowski, Waldkirch (DE); Martin Oberländer, Waldkirch (DE)

(73) Assignee: SICK ENGINEERING GMBH, Ottendorf-Okrilla (DE)

(*) Notice: Subject to any disclaimer, the term of this patent is extended or adjusted under 35 U.S.C. 154(b) by 11 days.

(21) Appl. No.: 16/193,088

(22) Filed: Nov. 16, 2018

(65) Prior Publication Data

US 2019/0242734 A1   Aug. 8, 2019

(30) Foreign Application Priority Data

Feb. 6, 2018  (EP) .................................... 18155305

(51) Int. Cl.
*G01F 1/66* (2006.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 4,467,659 A | 8/1984 | Baumoel | |
| 7,658,114 B1 | 2/2010 | Sui et al. | |
| 8,234,934 B2* | 8/2012 | Dietz | G01F 1/662 |
| | | | 73/861.31 |
| 9,453,749 B1* | 9/2016 | Bachmann | G01F 1/662 |
| 9,903,745 B2* | 2/2018 | Drachmann | G01F 1/662 |
| 10,330,509 B2* | 6/2019 | Funck | G01P 5/245 |
| 2002/0053243 A1 | 5/2002 | Su | |
| 2013/0174669 A1 | 7/2013 | Sui et al. | |
| 2016/0334255 A1* | 11/2016 | Gestner | G01F 1/667 |

(Continued)

FOREIGN PATENT DOCUMENTS

| | | |
|---|---|---|
| DE | 102005047790 A1 | 4/2007 |
| DE | 10 2013 101 950 A1 | 11/2013 |

(Continued)

OTHER PUBLICATIONS

European Search Report dated Jul. 23, 2018 issued in corresponding European Application No. 18155305.8.

*Primary Examiner* — Jewel V Dowtin
(74) *Attorney, Agent, or Firm* — Nath, Goldberg & Meyer; Jerald L. Meyer

(57) ABSTRACT

An ultrasound flow measurement apparatus is provided having a plurality of ultrasonic transducers for determining the flow rate of a fluid flowing in a line, said ultrasound flow measurement apparatus having a plurality of measurement paths at which two respective ones of the ultrasonic transducers are arranged opposite one another with the flow being arranged therebetween and with a mutual axial spacing in the longitudinal direction of the line and having an evaluation unit that is configured to calculate the flow rate from time of flight differences of ultrasonic signals along the respective measurement paths in the direction with the flow and against the flow. The measurement paths have different axial offsets here.

17 Claims, 4 Drawing Sheets

(56) References Cited

U.S. PATENT DOCUMENTS

Figure 1A:
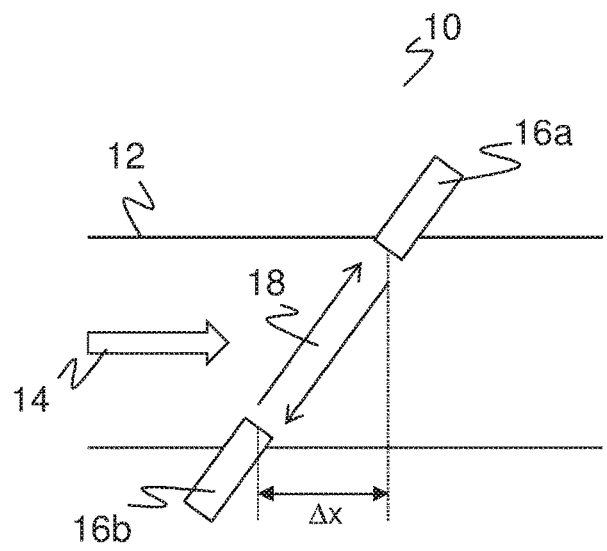

2017/0343398 A1* 11/2017 Nakai ................... G01F 1/662
2018/0149511 A1* 5/2018 Ploss .................. G01F 25/0007
2020/0003593 A1* 1/2020 Mayle ................... G01F 1/667

FOREIGN PATENT DOCUMENTS

DE   20 2013 105 800 U1   4/2015
EP           1 378 727 B1   11/2005

* cited by examiner

ULTRASOUND FLOW MEASUREMENT APPARATUS AND METHOD FOR DETERMINING THE FLOW RATE

The invention relates to an ultrasound flow measurement having a plurality of ultrasonic transducers for determining the flow rate of a fluid flowing in a line, said ultrasound flow measurement apparatus having a plurality of measurement paths at which two respective ones of the ultrasonic transducers are arranged opposite one another with the flow being arranged therebetween and with a mutual axial spacing in the longitudinal direction of the line and having an evaluation unit that is configured to calculate the flow rate from time of flight differences of ultrasonic signals along the respective measurement paths in the direction with the flow and against the flow. The invention further relates to a method for determining the flow rate of a fluid flowing in a line in which method ultrasonic signals are transmitted and received in a direction with and against the flow and the flow rate is calculated from time of flight differences of the ultrasonic signals along a plurality of measurement paths that are spanned by two respective ultrasonic transducers with the flow therebetween and with a mutual axial spacing in the longitudinal direction of the line.

A proven method for measuring the flow rate or the velocity of flow is the differential time of flight method. In this respect, a pair of ultrasonic transducers is mounted with mutual offset in the longitudinal direction at the outer periphery of the conduit, said pair of ultrasonic transducers transmitting and registering ultrasonic signals alternately transversely to the flow along the measurement path spanned between the ultrasonic transducers. The ultrasonic signals transported through the fluid are accelerated or decelerated by the flow depending on the running direction. The resulting time of flight difference is calculated using geometrical parameters to form a mean flow rate of the fluid. The volume flow or velocity of flow results from this with the cross-sectional area. For more exact measurements, a plurality of measurement paths each having a pair of ultrasonic transducers can also be provided to detect a flow cross-section.

The ultrasonic transducers used to generate the ultrasound have an oscillating body, frequently a ceramic material. With its aid, an electric signal is, for example, converted into ultrasound, and vice versa, on the basis of the piezoelectric effect. Depending on the application, the ultrasonic transducer works as a sound source, as a sound detector or as both. In this respect, a coupling has to be provided between the fluid and the ultrasonic transducer. A widespread solution comprises leading the ultrasonic transducer into the line with a direct contact to the fluid. Such intrusive probes can, however, make exact measurements more difficult due to a disturbance of the flow. Conversely, the dipping ultrasonic transducers are exposed to the fluid and to its pressure and temperature and are thereby possibly damaged or lose their function due to deposits.

Techniques are generally also known in which the inner wall remains completely closed. One example is the so-called clamp-on assembly, for instance in accordance with U.S. Pat. No. 4,467,659, with which ultrasonic transducers are fastened to the line from the outside. However, only diametrical measurement paths can thus be implemented through the conduit axis, whereby additional errors are generated with non-axially symmetrical flow profiles.

EP 1 378 272 B1 proposes attaching the ultrasound-generating elements to an outer side of a wall. Unlike the clamp-on technique, the ultrasonic transducer is in this respect so-to-say integrated into the wall. A pocket having a substantially smaller wall thickness than the remaining wall is formed in the region of the ultrasonic transducers and the remaining wall thickness forms the membrane of the ultrasonic transducer. This assembly, also known as clamp-in, is so-to-say an intermediate form between a fixed assembly in the inner space of the line and the clamp-on assembly.

The ultrasonic transducers always also generate structure-borne noise transmitted through the line wall in addition to the fluid-borne noise. The structure-borne noise is an interference value since it remains uninfluenced by the fluid and its flow, that is it does not include the desired measurement information, and is temporally superposed on the measurement signal. With intrusive probes, the structure-borne noise can be minimized by constructive damping structures that acoustically decouple the ultrasonic transducer from the line. This is no longer possible with a clamp-on or clamp-in installation in which ultrasonic signals are transmitted through the line wall or even directly excite a part of the line wall. Nor can structure-borne noise be separated from fluid-borne noise by classical algorithmic filter processes since the frequencies of structure-borne noise and fluid-borne noise coincide.

DE 20 2013 105 800 U1 discloses an ultrasound measurement apparatus using ultrasonic transducers in clamp-in installation. To suppress the propagation of structure-borne noise, damping regions having scatter sites, for example in the form of weld seams, are provided in the line wall. However, the interference effect due to structure-borne noise can at best be reduced a little in this manner; the problem remains in principle.

It is therefore the object of the invention to improve the measurement accuracy of an ultrasound flowmeter.

This object is satisfied by an ultrasound flow measurement apparatus and by a method for determining the flow rate of a fluid flowing in a line in accordance with the respective independent claim. The ultrasound flow measurement apparatus is in principle a multi-path counter and accordingly measures at a plurality of measurement paths that are each spanned by two ultrasonic transducers using a differential time of flight method. The ultrasonic transducers of a measurement path are arranged at line walls that are diametrically opposed or are opposed in a radially offset manner so that the measurement paths run through the fluid. In addition, the ultrasonic transducers are offset from one another at an axial spacing, that is in a longitudinal direction of the line, so that the extent of the measurement path has a component with the flow and against the flow. The flow rate is calculated from time of flight differences along the plurality of measurement paths.

The invention now starts from the basic idea of not placing the plurality of paths in the same cross-sectional plane, as otherwise usual with a multi-path counter, but rather of providing them with a different axial offset. A conventional multi-path counter attempts to measure an irregular flow more accurately by a multiple sampling of the same cross-section at a plurality of points. In accordance with the invention it is a question of providing measurement paths in which the ratio of the propagation paths for the fluid-borne noise and the structure-borne noise varies, and indeed with a flow behavior for these measurement paths that is as equal as possible. This provides the precondition for compensating the effects of the structure-borne noise in the evaluation. This variation is achieved via the axial spacing.

The invention has the advantage that a much more accurate measurement becomes possible. Due to the special arrangement of the ultrasonic transducers and the measurement paths, in particular with an associated signal processing still to be explained, the desired measurement signal becomes substantially easier to detect, the influence of the structure-borne nose on the measurement of the time of flight difference is compensated, and the systematic uncertainty of the flow measurement is considerably reduced in this manner.

The measurement paths are preferably arranged in a common plane in parallel with the line. Such a plane can also be called a longitudinal plane. In a cross-sectional view, the measurement paths are consequently above one another and they have the same secant angle that describes the angular offset from a diametric extent. It must again be emphasized that the measurement paths are differently arranged than in a conventional multi-path counter. Measurement paths in a common longitudinal plane practically sample the same flow region, but at different axial spacings. It would be conceivable to provide further groups of measurement paths in respective different longitudinal planes, with different axial spacings within the group. The would then correspond to the sampling of a flow profile as with a conventional multi-path counter, with the conventional measurement paths being replaced with a group in accordance with the invention of measurement paths within the same longitudinal plane. Reference is made almost everywhere in this description only to a group of measurement paths that together practically forms a single measurement path of a conventional multi-path counter, with the possibility of a plurality of groups always being present.

The measurement paths are preferably arranged directly after one another. The aim of the arrangement of measurement paths in accordance with the invention is to vary only the axial spacing where possible. The remaining conditions, and above all the flow behavior, should remain identical for these measurement paths in the ideal case. If the measurement paths are arranged as closely as possible after one another, i.e. in parallel with the line axis in the longitudinal direction, this is almost approximately achieved since the flow practically does not change over the shortest flow path therebetween.

The measurement paths preferably form a saw tooth shape together. Such a saw tooth shape or zigzag shape is a particularly favorable arrangement that makes it possible to monitor very similar or practically identical flow sections in a compact measurement path layout. The saw teeth are not completely the same size since the axial spacing should be varied.

Ultrasonic transducers at tips of the saw tooth shape are preferably involved at both adjacent measurement paths. This can naturally not apply to the two ultrasonic transducers at the margin, that is at the start and at the end of the saw tooth shape. The middle ultrasonic transducers can, however, span measurement paths in two directions with a sufficiently large irradiation angle so that fewer ultrasonic transducers are required overall, that is in particular only n+1 ultrasonic transducers for n measurement paths. The ultrasound transducers are anyway preferably controlled in a time offset because otherwise the measurements would interfere with one another so that the dual use of one ultrasonic transducer in two measurement paths does not mean any additional restrictions.

The evaluation unit is preferably configured to estimate at least one characteristic value of a function that describes the dependence of the time of flight or of the time of flight difference on the axial spacing of the ultrasonic transducers from the plurality of measurements at the plurality of measurement paths and to calculate the flow rate from the characteristic value. The invention has recognized that an error that the superposed structure-borne noise causes in the measured time of flight difference varies with the axial spacing of the ultrasonic transducers that span the respective measurement path. The time of flight difference does not increase monotonously with the axial spacing, but rather forms an oscillation. It is the approach of the evaluation in accordance with the invention to observe the function of the time of flight difference in dependence on the axial spacing and to correct the oscillation. The function is detected by the plurality of measurement paths at a plurality of sampling points, namely at the plurality of axial spacings. The function can be estimated and the error compensated from this. It is not absolutely necessary for this to reconstruct the total function, but initially only at least one characteristic value thereof, for instance the pitch of a compensation straight line. The result is an improved measurement result that is in particular at least largely adjusted for systematic interference effects due to structure-borne noise. The underlying evaluation takes place on a measurement value plane and is therefore mathematically very simple in comparison with methods on a signal plane and is additionally extremely resource-saving since the classical time of flight measurement already makes higher demands on the device hardware. Alternatively to a compensation of the time of flight differences, it is also conceivable already to correct the times of flight themselves and then to determine the time of flight difference from them as usual.

The evaluation unit is preferably configured for a linear adaptation of the function. A linear adaptation is possible with comparatively little effort, but is sufficient for the correction of the oscillation. This is therefore an example of a characteristic value of the function. The still remaining residual error decisively depends on the number of measurement paths, whereby a high scaling capability results with respect to the accuracy and to the costs of the ultrasound flow measurement apparatus. The evaluation is risk-free since only an averaging of the individual measurements simply results even with unsuitable measurement path configurations in which, for example, all the measurement paths have the same axial spacing. Alternatively to a linear adaptation, it would also be conceivable to attempt to reconstruct the oscillation overall. This is, however, considerably more complex, requires more measurement paths to acquire additional sampling points, and does not nevertheless promise necessarily better results.

The evaluation unit is preferably configured also to adopt a vanishing time of flight difference for the linear adaptation with a vanishing axial spacing. An additional sampling point is thus acquired without measurement or the constant displacement of the sought straight line is determined at zero in advance. This is also a sensible, non-approximating, or even falsifying assumption since the ultrasound on such a hypothetical measurement path moves perpendicular to the flow and should therefore require equally long in both directions. In an alternative compensation already taking place on the plane of times of flight, not time of flight differences, this assumption naturally does not apply since the times of flight themselves will not vanish, but are only of equal length.

The evaluation unit is preferably configured to determine a compensated time of flight or time of flight difference from the linear adaptation with an axial spacing that corresponds to a mean value of the axial spacings of the measurement paths. Under ideal conditions, the function or its linear adaptation would include an equivalent piece of measurement information at each point. However, due to fluctuations in the measurement values, it is actually not equivalent for different axial spacings and it can be expected that the piece of information becomes worse remote from the measured sampling points. An evaluation within the range detected by sampling points is therefore particularly suitable and the mean value of the axial spacings of the measurement paths among these points can be used as a clearly determinable, well-suited value.

At least four measurement paths are preferably provided. This in turn relates to the measurement paths that are used in common for a reconstruction of the oscillation or for a linear adaptation. The at least four measurement paths therefore have the different axial offset and are preferably in the same longitudinal plane, even more preferably directly after one another. Four values are sufficient to reliably reconstruct or compensate an oscillation or to linearly adapt it. Fewer measurement paths and thus values are admittedly also conceivable, but would only insufficiently detect the function and accordingly introduce additional errors without additional information, for example on the frequency of the oscillation. Additional measurement paths and thus values are not necessary from a purely mathematical aspect, but are absolutely advantageous because the overdetermination can compensate statistical effects due to measurement errors, tolerances and the like. A weighing up has to be made between effort and accuracy demands here.

The ultrasonic transducers are preferably attached to the line from the outside. Both options of a clamp-on assembly or clamp-in assembly are thus initially meant. The advantage is that the interior of the line remains undisturbed and ultrasonic transducers can possibly be retrofitted or converted without opening the line. The line respectively has to transmit ultrasound or is even separately excited qua unit concept here. Particularly large effects due to the structure-borne noise therefore have to be anticipated, with a damping not being possible because this would simultaneously impair the measurement effect. The invention can, however, considerably reduce the negative influence of the structure-borne noise on the accuracy of the time of flight measurement and thus the systematic error of the flow measurement.

A line wall of the line preferably has a plurality of pockets in which a thin-walled region inwardly remains, with the ultrasonic transducers being arranged in a respective one pocket and having an oscillating body that couples to the thin-walled region that acts as a membrane of the ultrasonic transducer capable of vibration. In this clamp-in assembly, not only the interior of the line remains without impairment, but the ultrasonic signal is also coupled very easily into the fluid due to the excitation of the thin-walled region. Non-diametrical measurement paths are additionally possible.

The method in accordance with the invention can be further developed in a similar manner and shows similar advantages in so doing. Such advantageous features are described in an exemplary, but not exclusive manner in the subordinate claims dependent on the independent claims.

The measurements of a time of flight or of a time of flight difference along a measurement path are preferably understood as a sampling point of a function that describes the time of flight or the time of flight difference in dependence on the axial spacing. The measurements and measurement paths therefore serve to determine the function selectively in order thus to acquire a more exact measurement value with a smaller systematic error. It is conceivable for this purpose to reconstruct, approximate or interpolate the function from the measurements or to determine a characteristic parameter of the function.

A linear adaptation of the function is preferably carried out. This can be carried out simply and simultaneously achieves very good results. The flow rate is in particular determined from a value of the function at an axial spacing that corresponds to the focus of the axial spacings of the measurement paths. It has already been explained that it is meaningful to use or read off the function where it is particularly reliably detected by the sampling points under real conditions with measurement tolerances.

Figure 1C:
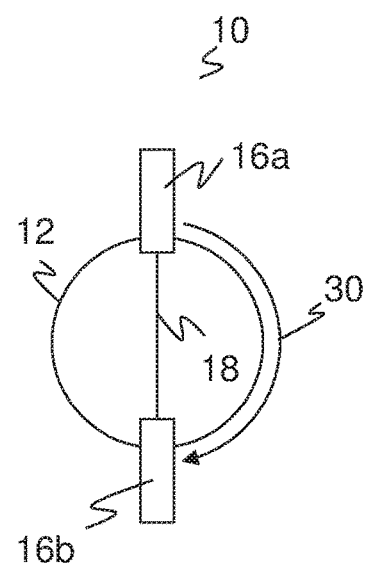
Figure 1B:
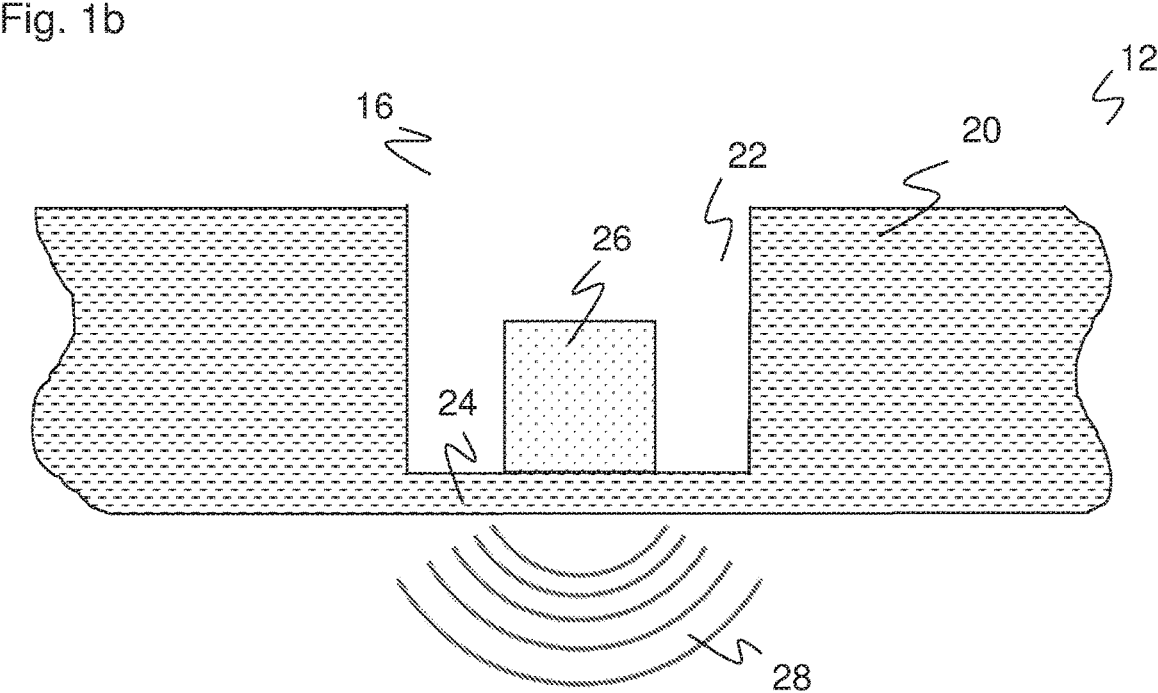
Figure 2:
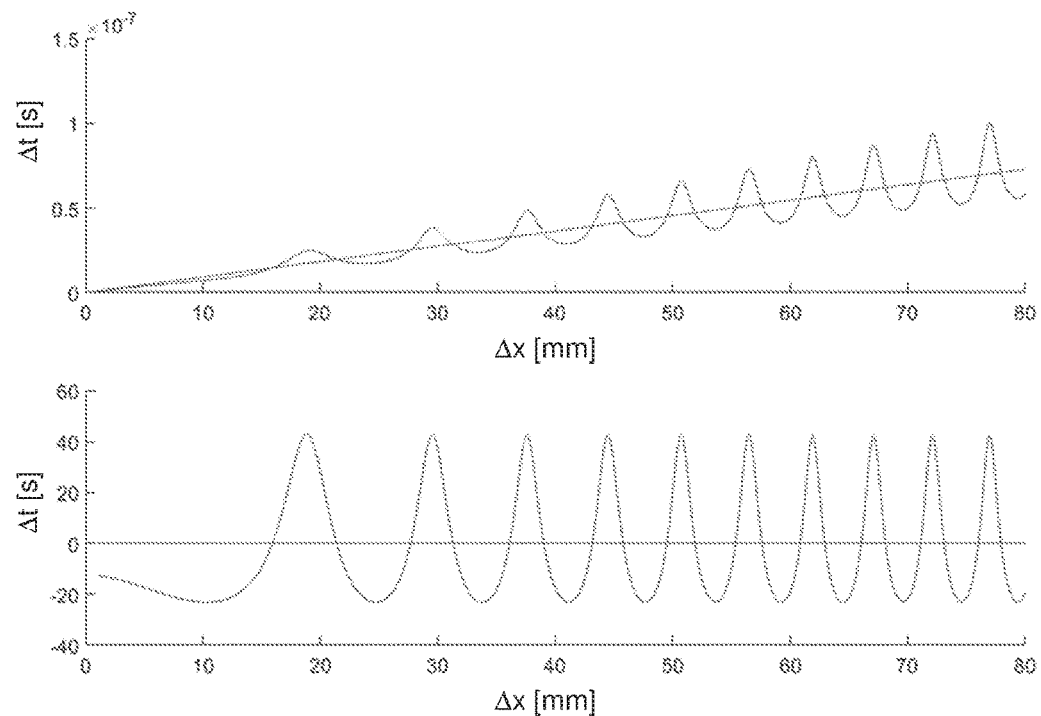
Figure 3A:
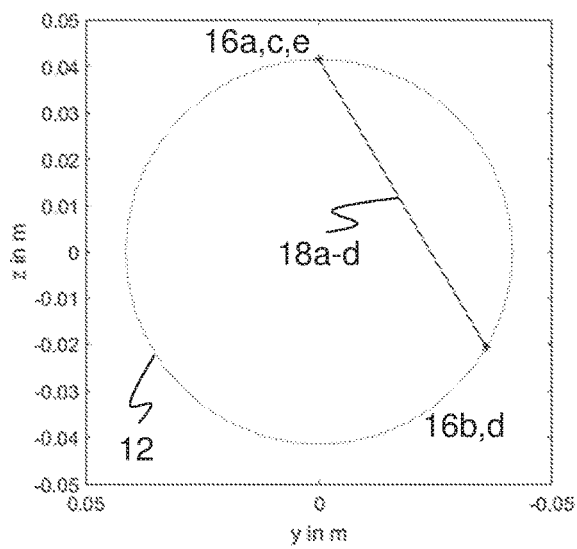
Figure 3B:
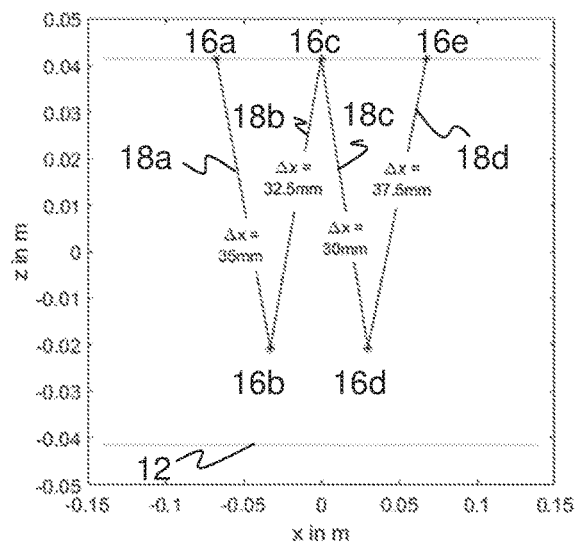
Figure 4:
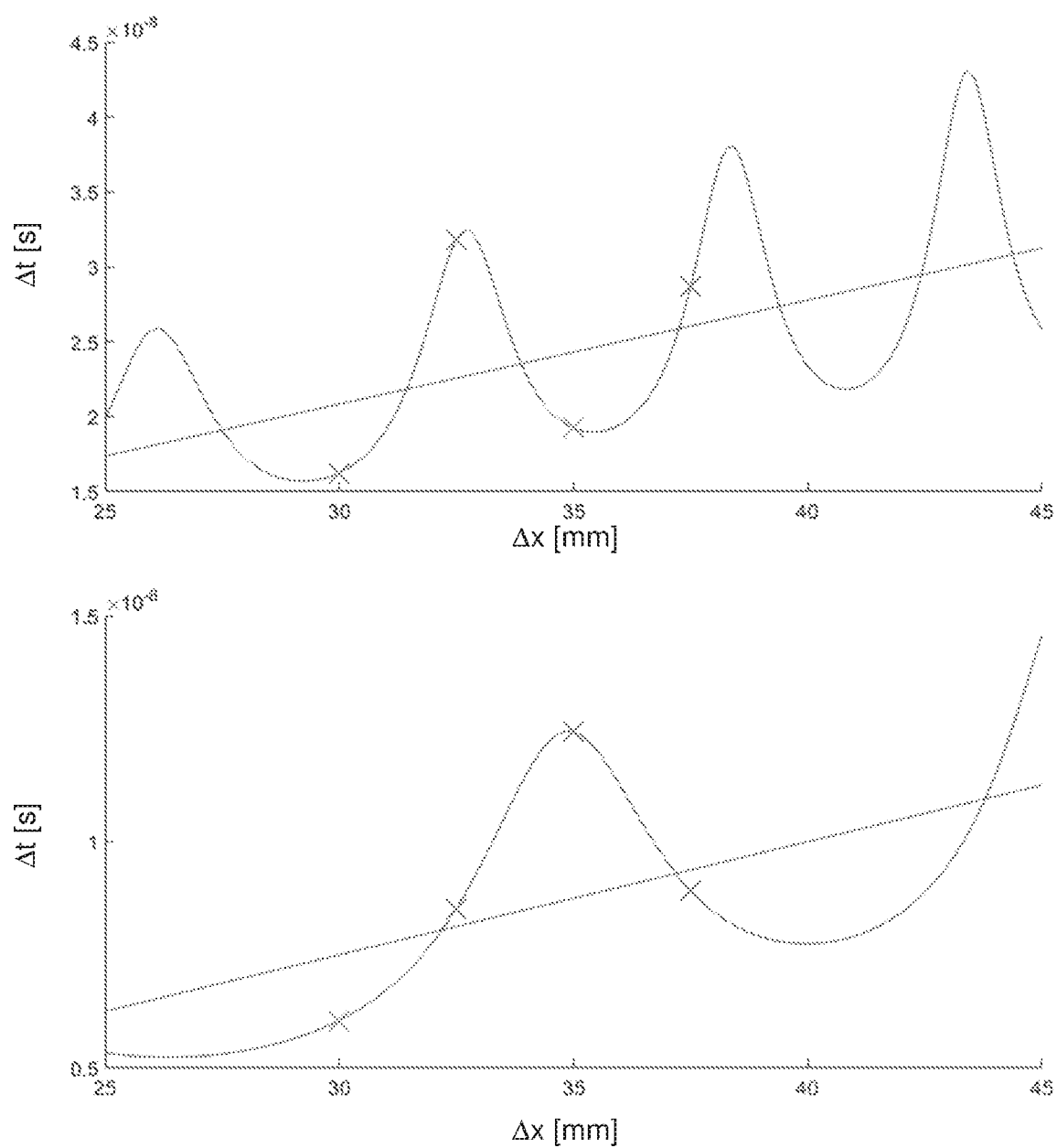
Figure 5:
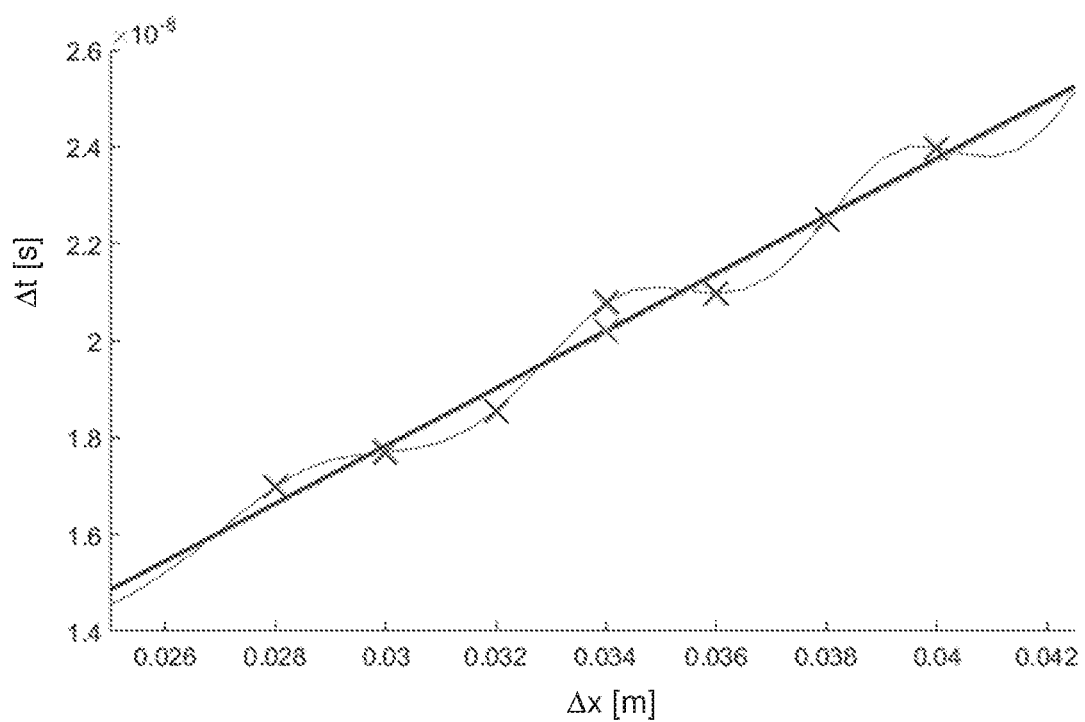

The invention will be explained in more detail in the following also with respect to further features and advantages by way of example with reference to embodiments and to the enclosed drawing. The Figures of the drawing show in:

FIG. 1a a schematic longitudinal sectional view of a line for explaining the differential time of flight method for a flow measurement using ultrasound, FIG. 1b a schematic representation of a line wall for explaining the clamp-in assembly of an ultrasonic transducer;

FIG. 1c a schematic cross-sectional representation of a line to illustrate the propagation of structure-borne noise;

FIG. 2 representations of the function of the time of flight difference in dependence on the axial spacing of the ultrasonic transducers of a measurement path (top) and relative error with respect to the non-disturbed case without structure-borne noise (bottom) from a simple modeling;

FIG. 3a a cross-sectional representation of a measurement path configuration in accordance with the invention;

FIG. 3b a longitudinal sectional representation of the measurement path configuration in accordance with the invention in accordance with FIG. 3a;

FIG. 4 representations of the function of the time of flight difference in dependence on the axial spacing of the ultrasonic transducers and values of the four measurement paths for the measurement path configuration in accordance with FIG. 3 with fluid speeds of sound of 1200 m/s (top) and 2000 m/s (bottom); and FIG. 5 a further representation of the function of the time of flight difference in dependence on the axial spacing of the ultrasonic transducers with the values of seven measurement paths in a further measurement path configuration.

FIG. 1a shows in a longitudinal sectional view an ultrasound flowmeter 10 in accordance with the differential time of flight method that is installed at a line 12. A fluid flows through the line 12 in the direction marked by the arrow 14. A pair of ultrasonic transducers 16a-b is arranged at a line wall to selectively transmit and receive an ultrasound signal in the one or the other direction along a measurement path 18 spanned between the ultrasonic transducers 16a-b. The acoustic wave propagating through the fluid is also called fluid-borne noise.

The two ultrasonic transducers 16a-b are offset with respect to one another in the longitudinal direction of the line 12, where $\Delta x$ designates the corresponding axial spacing. The fluid-borne noise thereby moves with the flow in the one direction and against the flow in the other direction. A time of flight difference results from this from which the flow rate of the fluid can be calculated. The evaluation, that is also known up to this point, takes place in a control and evaluation unit, not shown, of the ultrasound flowmeter 10 that is connected to the ultrasonic transducers 16a-b.

The line 12 in the region of the ultrasound measurement forms a measurement body of the ultrasound flowmeter 10. The representation has been selected as if this measurement body were an integral part of the existing line 12. This is possible in principle, but in practice, the ultrasound flowmeter 10 is manufactured with its own measurement body that replaces a corresponding section of an existing line after the assembly and is for this purpose, for example, inserted at both sides by flange connections.

FIG. 1a only shows one measurement path 18 as representative. The ultrasound measurement path actually comprises a plurality of measurement paths 18 that will also be looked at in more detail further below. A distinction must be made here between a plurality of measurement paths 18 that have a different axial offset Δx in accordance with the invention, but that practically measure the flow at the same point, and a plurality of paths in the conventional sense. In a conventional multi-path counter, a plurality of measurement paths namely form a layout having different extents through a cross-section of the line 12 to enable a more exact measurement with an irregular flow or disturbed states. This is also possible in accordance with the invention, but with then a respective group of measurement paths 18 having a different axial offset Δx replacing a conventional measurement path. This possibility will no longer be mentioned in the following, but for simplification only one such group of measurement paths 18 is looked at, which is also sufficient for a more or less homogeneous flow and otherwise forms a first approximation for a more complicated flow.

FIG. 1b shows a schematic representation of a line wall 20 of the line 12 to explain the clamp-in assembly of an ultrasonic transducer 16. The clamp-in assembly makes use of the advantages in accordance with the invention to a special degree, but a clamp-on is alternatively also conceivable and possibly even a conventional intrusive transducer installation.

In the clamp-on assembly, a hollow space or a pocket 22 is formed in the line wall 20. A thin-walled part region 24 of the line wall 20 remains toward the inside in the region of the pocket 22; it simultaneously serves as a membrane of the ultrasonic transducer 16a and is excited to oscillate by its oscillating body 26, for example a piezoceramic material, to transmit an ultrasonic signal; or conversely, the oscillating body 26 is excited to oscillate on an impact of an ultrasonic signal from the interior of the line 12 on the part region 24. For simplification, only the oscillating body 26 of the ultrasonic transducer 15 is shown in FIG. 1b. The thin-walled part region 24 remains stable enough to withstand an internal line pressure to be expected. The line wall 20 forms an inner surface closed in itself without recesses or projections that could disturb the flow or at which deposits could settle.

As indicated by sound propagation lines 28, the outward and inward irradiation directions of the ultrasonic transducers 16a-b are perpendicular to a center axis of the line 12. In order nevertheless to achieve an axial offset Δx and thus a measurement effect in a time of flight differential method, a relatively broad irradiation characteristic is provided. It is alternatively conceivable to arrange the ultrasonic transducer 16 obliquely, with this, however, being more laborious and/or expensive from a construction aspect and possibly also requiring modifications of the line wall 20 that also have an effect on the flow.

FIG. 1c again shows the pair of ultrasonic transducers 16a-b of FIG. 1a, this time in a cross-sectional view. The diametrical arrangement is purely by way of example; the measurement path 18 can also be disposed next to the axis of the line 12. The angle the measurement path 18 then includes with the diameter of the line 12 is called a secant angle.

With a clamp-on installation or clamp-in installation, equally with an insufficient damping of intrusively arranged ultrasonic transducers 16a-b, structure-borne noise also arises in addition to the desired fluid-borne noise with which the times of flight are measured, said structure-borne noise propagating through the line 12 and likewise reaching the oppositely disposed ultrasonic transducers 16a-b, for example on the propagation path indicated by an arrow 30. The structure-borne noise is not influenced by the flow and therefore also does not include any useful measurement information on the flow rate, but likewise excites the oppositely disposed ultrasonic transducers 16a-b, even with the same frequency. This superposition of the fluid-borne noise and the structure-borne noise produces measurement paths.

This should now be examined more closely in an initially very simplified mathematical observation of the effect of the structure-borne noise on the time of flight measurement. In a real differential time of flight measurement, both fluid-borne noise and structure-borne noise typically have a plurality of time-limited pulses that generally overlap. Let it, however, be assumed as a simplification that fluid-borne noise and structure-borne noise represent monofrequency harmonic oscillations of the same frequency and of a respective constant amplitude that are detected by the receiving ultrasonic transducers 16a-b after their corresponding time of flight through the fluid or through the line 12.

In addition, as a further simplification, there should only be one structure-borne noise signal at an associated speed of sound. As a rule, a plurality of structure-borne noise modes having different speeds of sound and possibly a dispersive behavior would actually be present. The following modeling of the signal portions results under said preconditions:

$$\text{Signal}_{Fluid-AB/BA} = \begin{cases} A_{Fluid} * \sin(\omega t + \varphi_{Fluid-AB/BA}), & t \geq TOF_{Fluid} \\ 0, & t < TOF_{Fluid} \end{cases},$$

$$\text{Signal}_{Structure} = \begin{cases} A_{Structure} * \sin(\omega t + \varphi_{Structure}), & t \geq TOF_{Structure} \\ 0, & t < TOF_{Structure} \end{cases}.$$

$sA_{Fluid}$ and $A_{Structure}$ are here the amplitudes of the fluid portion or structural portion; ω is the working circuit frequency of the ultrasonic transducers 16a-b; t is the time; and $\varphi_{Fluid-AB/BA}$, $\varphi_{Structure}$ are the phasing of the signals at the receiving ultrasonic transducers 16a-b. The latter should here relate to the time of arrival (TOF, time of flight) of an undisturbed fluid signal in the flow-less case (VOF–velocity of fluid). $\varphi_{Fluid-AB} = \varphi_{Fluid-BA} = 0$ consequently applies at VOF=0.

With a finite flow rate (VOF), the absolute times of flight change and thus the phases of the fluid signals approximately symmetrically for the two measurement directions; and thus $$\varphi_{Fluid-AB} \approx -\frac{\Delta t}{2} * \omega, \quad \varphi_{Fluid-BA} \approx \frac{\Delta t}{2} * \omega$$

for VOF≠0.

The resulting time of flight difference (Δt) here also depends on the speed of sound of the fluid ($SOS_{Fluid}$) and linearly on the axial spacing Δx in addition to the flow rate:

$$\Delta t = \frac{VOF}{SOS_{Fluid}^2} * \Delta x.$$

This linearity in Δx can advantageously be utilized later for the evaluation and compensation of systematic measurement errors due to structure-borne noise.

The phase of the structure-borne noise is independent of the flow in the line 12 and results from the absolute time of flight difference of the structure-borne noise and the fluid-borne noise in the flow-less case.

$$\varphi_{Structure} = \omega * (TOF_{Structure} - TOF_{Fluid-VOF=0}),$$

$$\varphi_{Structure} = \omega * \left(\frac{L_{Structure}}{SOS_{Structure}} - \frac{L_{Fluid}}{SOS_{Fluid}}\right).$$

L here designates the respective path distance through the fluid or through the line wall 20.

The receiving ultrasonic transducer 16a-b always measures the following superposition of fluid-borne noise and structure-borne noise for times $t \geq TOF_{Fluid} > TOF_{Structure}$ in dependence on the measurement direction:

$$Signal_{AB} = A_{Fluid}*\sin(\omega t + \varphi_{Fluid-AB}) + A_{Structure}*\sin(\omega t + \varphi_{Structure}),$$

$$Signal_{BA} = A_{Fluid}*\sin(\omega t + \varphi_{Fluid-BA}) + A_{Structure}*\sin(\omega t + \varphi_{Structure}).$$

The measured variable is the effective phase difference δ of the superposed signals from the to and fro direction that is adopted since this exactly corresponds to the time of flight difference determined in the ultrasound flow meter 10. The calculation starts from the following addition theorem for angular functions:

$$A_1*\sin(x+\varphi_1) + A_2*\sin(x+\varphi_2) = \sqrt{A_1^2 + A_2^2 + 2A_1A_2\cos(\varphi_1-\varphi_2)}*\sin*x+\delta).$$

The resulting phase Δδ of the superposition is of interest to which:

$$\delta = \arctan\left(\frac{A_1\sin(\varphi_1) + A_2\sin(\varphi_2)}{A_1\cos(\varphi_1) + A_2\cos(\varphi_2)}\right).$$

applies. If this is applied to the superpositions $Signal_{AB}$, $Signal_{BA}$ a phase difference Δδ or a measured time of flight difference $\Delta t_{res}$ between the measurement directions can be read off directly from the arguments of the sine function.

$$\omega * \Delta t_{res} = \Delta\delta = \delta_{BA} - \delta_{AB}.$$

If the initially specified signal portions are used in the formula following from the addition theorem for the phase δ of the superposition $$\Delta\delta = \arctan\left(\frac{A_{Fluid}\sin\left(\frac{\Delta t}{2}*\omega\right) + A_{Structure}\sin(\varphi_{Structure})}{A_{Fluid}\cos\left(\frac{\Delta t}{2}*\omega\right) + A_{Structure}\cos(\varphi_{Structure})}\right) -$$

$$\arctan\left(\frac{A_{Fluid}\sin\left(-\frac{\Delta t}{2}*\omega\right) + A_{Structure}\sin(\varphi_{Structure})}{A_{Fluid}\cos\left(-\frac{\Delta t}{2}*\omega\right) + A_{Structure}\cos(\varphi_{Structure})}\right).$$

results. The expression is simplified again as expected for the undisturbed case ($A_{Structure}=0$) to:

$$\Delta\delta(A_{Structure} = 0) = \frac{\Delta t}{2}*\omega - \left(-\frac{\Delta t}{2}*\omega\right) = \Delta t*\omega.$$

The time of flight difference and thus also the phase difference are, as specified above in the formula for Δt, solely determined by the axial spacing Δx and by the flow rate and the fluid-borne speed of sound. In the disturbed case with $A_{Struktur} > 0$, the amplitudes $A_{Fluid}$ and $A_{Struktur}$ or their ratio and the relative phase $\varphi_{Struktur}$ of the structure-borne noise also come into play as additional influencing variables. Said relative phase depends, as specified above, on the fluid path length and on the structure path length and on the structure-borne noise speed of both signal portions. Changes in the path lengths or/and in the speeds of sound change the relative phase $\varphi_{Struktur}$ of the structure-borne noise.

In the following, the case should now be looked at that amplitudes, speeds of sound, and the flow rate are constant, while the axial spacing Δx of the ultrasonic transducers 16a-b is varied in the longitudinal direction or along the line axis. Reactions result here, on the one hand, on the fluid time of flight difference Δt and on the path lengths L of both signal portions and thus on the relative phase of the structure-borne noise $\varphi_{Structure}$. For a diametrical path as in FIG. 1a

$$L_{Fluid} = \sqrt{D_i^2 + \Delta x^2} \text{ and } L_{Structure} = \sqrt{\left((D_i + W)\frac{\pi}{2}\right)^2 + \Delta x^2}.$$

apply to the path lengths. $D_i$ is the inner diameter of the line 12 here and W is the wall thickness of the line wall 20.

FIG. 2 shows an example for the function of the time of flight differences in dependence on the axial spacing Δx for values between 0 and 80 mm in accordance with this model in which the time of flight difference behaves in accordance with the above-specified formula for Δδ. The time of flight difference is shown in the upper part and the relative error to the undisturbed case in the lower part. A DN80 pipe with a 4 mm wall thickness was assumed as the line 12, a flow rate of 1 m/s, and a transducer frequency of the ultrasonic transducers 16a-b of 700 kHz. Furthermore a speed of sound of 1480 m/s at an amplitude of 1 is selected for the fluid-borne noise and a speed of sound of 3000 m/s at an amplitude of 0.3 is selected for the structure-borne noise.

The undisturbed case $A_{Structure}=0$ is additionally drawn that, as expected, is described by a linear relationship between the time of flight difference and the axial spacing Δx. If, in contrast, structure-borne noise is superposed on the fluid-borne noise, this linear extent is modulated by an asymmetrical, non-harmonic oscillation that causes substantial errors of the measured time of flight difference with respect to just fluid-borne noise in dependence on the position of the ultrasonic transducers 16a-b. The amplitude of the oscillation and thus the level of the maximum error depend on the amplitude ratio of the signal portions. With the ratio of structure-borne noise to fluid-borne noise 3:10 selected here, the maximum error amounts to approximately 43%.

The periodicity of the disturbance cannot be explicitly specified, but results implicitly from the demand $\varphi_{Structure}(\Delta x_2 - \Delta x_1) = 2\pi$ that is likewise derived from the above-assumed model. The periodicity thus depends on the path lengths and on the speeds of sound of fluid-borne noise and structure-borne noise. While the path lengths can be determined as part of the unit design, the fluid-borne noise speed is a process parameter than varies greatly under certain circumstances and that is not predictable from the unit side. A single measurement path 18 can thus experience all the possible error contributions of the structure-borne noise as part of the occurring oscillation in dependence on the fluid-borne noise speed. In the example looked at here, a very substantial error band thereby results of approximately 65% (−20% to 45%).

FIG. 3a shows, in a cross-sectional view in FIG. 3a and in a longitudinal sectional view in FIG. 3b, an exemplary layout of measurement paths 18a-d that implements different axial spacings Δx of the ultrasonic transducers 16a-e that respectively span a measurement path 18a-d. The just acquired knowledge of the influence of structure-borne noise on the time of flight differences should thus be used to ultimately compensate the effects of the oscillating modulation. It must be noted here that very simplifying assumptions were admittedly made in the observation of the model, but that the essential statements and conclusions are maintained in simulations of the inventors in which these simplifications are no longer a condition.

The axial spacings Δx and thus the path lengths are to be selected such that the oscillation of the time of flight difference is sufficiently sampled for, where possible, all of the speeds of sound of the fluid relevant to practice, but not known in the specific case. What is decisive here is the speeds of sound of the fluid and of the line wall 20 as well as the path length conditions that in turn depend on the line diameter and on the path angles that can be realized.

In the example shown with a DN80 pipe and realistic fluid-borne noise rates between 1200 and 2000 m/s, a gradation of the axial spacings Δx of at most 3 mm is advantageous. A secant angle of 30° is selected in FIG. 3, i.e. an angle toward the perpendicular cross-sectional diameter, and the axial spacings Δx amount to between 30 mm and 37.5 mm as indicated in FIG. 3b. Different numerical values for secant angles, axial spacings Δx and a different path layout overall are naturally possible.

As can be recognized in FIG. 3, it is advantageous to arrange the measurement paths 18a-d in a common longitudinal plane in parallel with the line axis. With a likewise advantageous equal secant angle, they then coincide in the cross-sectional view of FIG. 3a, that is they are after one another. A kind of saw tooth pattern or zigzag pattern of the measurement paths 18a-d also becomes recognizable in the longitudinal sectional view. This has the advantage, on the one hand, that the measurement paths 18a-d are directly behind one another. It can be assumed that the flow dos not change noticeably over this short distance so that the measurement paths 18a-d practically measure the same flow component and in fact, as desired, a variation only occurs in the axial spacing Δx.

The saw tooth arrangement has the advantage that the middle ultrasonic transducers 16b-d participate in two respective adjacent measurement paths in a dual function so that four measurement paths 18a-d become possible with only five ultrasonic transducers 16a-e instead of eight ultrasonic transducers. A comparatively small angle of irradiation is sufficient for this purpose that would also already be required for a measurement paths 18a-d in accordance with the arrangement in FIG. 1b. There are also no construction problems between the ultrasonic transducers 16a, c, e; 16b, d on one side due to the alternating arrangement. Different arrangements are nevertheless conceivable that dispense with the dual function or that implement them in mixed forms only for some of the measurement paths. An example is an ultrasonic transducer on the one side of the line 12 opposite which a plurality of ultrasonic transducers are disposed at increasing axial spacings Δx. The number of measurement paths 18a-d can also be varied. Additional measurement paths produce a better sampling of the oscillation, but also signify greater effort so that a weighing up has to be carried out here. Fewer measurement paths are also conceivable in principle, but with it having to be considered that a regular oscillation can already only be reconstructed by four points so accuracy losses must be anticipated here.

FIG. 4 is a representation of the oscillation that, in a similar manner to FIG. 2 above and with comparable conditions, was acquired for parameters not explicitly named as different from the formula for Δδ. A fluid-borne noise speed of 1200 m/s is assumed in the upper part here and of 2000 m/s in the lower part and the range for the axial spacing Δx on the X axis was restricted to a relevant region about the axial spacings Δx of the path layout in accordance with FIG. 3.

In operation, the time of flight differences are now determined on the different measurement paths 18a-d and are associated with the respective axial spacing Δx of the measurement path 18a-d. Four values that are marked as X in FIG. 4 are thereby produced with a four-path layout as in FIG. 3. It is conceivable to measure these values repeatedly and to average them. The oscillation is then reconstructed from these four values to remove its influence by calculation.

A linear adaptation is an advantageous possibility for this. It is not only suitable due to the comparatively small calculation effort, but also because the above-derived relationship for the time of flight difference is linear in Δx without any influence of the structure-borne noise. A linear behavior therefore corresponds to the sought case of the unadulterated fluid-borne noise. Since there is also no time of flight difference with a vanishing axial spacing Δx, the straight line of the linear adaptation can also be fit without a Y axis section.

In principle, the time of flight difference could now be read off at every point of the determined straight lines and a conclusion could be drawn on a path length via the associated axial spacing Δx to calculate the flow rate. However, it can be expected that the straight line particularly faithfully reproduces the relationships in the area of the actual sampling points, not only due to inevitable measurement fluctuations, but also due to the non-uniform oscillation. Reading therefore preferably takes place in the area of the sampling points, in particular at a point that corresponds to the mean value of the implemented axial spacings Δx. The greatest quality of the mathematical adaptation is expected here.

If the read off values at the just indicated point or at another point of the straight lines are given as $\Delta t_{\mathit{eff}}$ and $\Delta x_{\mathit{eff}}$, and if it is required that the fluid-borne noise speed is additionally known in a different manner an effective path speed of $$VOF_{\mathit{eff}} = \frac{\Delta t_{\mathit{eff}}}{\Delta x_{\mathit{eff}}} * SOS_{Fluid}^2.$$

results from the considerations of the model above. As already mentioned, this applies to the idealized case that all the measurement paths 18a-d measure a like flow situation, Otherwise deviations occur in the linear adaptation. It is therefore advantageous if the measurement paths 18a-d do not differ from one another in the radial direction since no rotationally symmetrical flow profiles can be expected in an installation relevant to practice. The flow profile effects are minimized if the measurement paths 18a-d are arranged, as in the example of FIG. 3, in parallel with the line axis directly behind one another in the longitudinal direction. It can then be assumed with justification that no great changes occur in the flow profile over the very short piece in the longitudinal direction. To also take flow differences in the radial direction into account, additional groups corresponding to the measurement paths 18a-d can, as already mentioned, be formed in a different location with respect to the cross-section that then correspond group-wise to the paths of a classical multi-path counter.

FIG. 5 again shows a representation of the oscillation or of the function of the time of flight difference in dependence on the axial spacing Δx similar to FIG. 4, but for a different example. Seven measurement paths are provided here instead of four and their axial spacings Δx are varied by 2 mm in each case. The time of flight differences determined on the measurement paths are associated with the axial spacing Δx of the respective measurement path and are accordingly marked as X.

The previously presented simple model is not used to determine the oscillation in FIG. 5 here, but rather a simulation much closer to reality having realistic signal forms and amplitude relationships as well as three structure-borne noise modes each having their own speeds of sound and their own dispersion behaviors. The resulting oscillation has a slightly different characteristic, but only differs a little in quality and recognizably still permits an evaluation, as was described above. A linear adaptation is in particular possible that is drawn as a straight line in FIG. 5 and that reconstructs the theoretical development of an undisturbed measurement of only the fluid-borne noise without structure-borne noise. It is again advantageous not to use any point of the straight lines as the basis of the further evaluation, but rather the focus of the axial spacings Δx with which measurement actually took place. This is drawn in FIG. 5 by the lower X with an axial spacing Δx of 34 mm.

The invention claimed is:

1. An ultrasound flow measurement apparatus, comprising:
  a plurality of ultrasonic transducers for determining the flow rate of a fluid flowing in a line;
  a plurality of measurement paths at which two respective ones of the plurality of ultrasonic transducers are arranged opposite one another with the flow being arranged between said two respective ones of the plurality of ultrasonic transducers and with said two respective ones of the plurality of ultrasonic transducers being arranged at a mutual axial spacing in a longitudinal direction of the line; and
  an evaluation unit that is configured to calculate the flow rate from time of flight differences of ultrasonic signals along the respective measurement paths in directions with the flow and against the flow, wherein the measurement paths have different axial offsets.

2. The ultrasound flow measurement apparatus in accordance with claim 1, wherein the measurement paths are arranged in a common plane in parallel with the line.

3. The ultrasound flow measurement apparatus in accordance with claim 1, wherein the measurement paths are arranged directly behind one another.

4. The ultrasound flow measurement apparatus in accordance with claim 1, wherein the measurement paths together form a saw tooth shape.

5. The ultrasound flow measurement apparatus in accordance with claim 4, wherein ultrasonic transducers are involved in peaks of the saw tooth shape at both adjacent measurement paths.

6. The ultrasound flow measurement apparatus in accordance with claim 1, wherein the evaluation unit is configured to estimate at least one characteristic value of a function that describes the dependence of the time of flight or of the time of flight difference on the axial spacing of the ultrasonic transducers from the plurality of measurements at the plurality of measurement paths and to calculate the flow rate from the characteristic value.

7. The ultrasound flow measurement apparatus in accordance with claim 6, wherein the evaluation unit is configured for a linear adaptation of the function.

8. The ultrasound flow measurement apparatus in accordance with claim 7, wherein the evaluation unit is configured also to adopt a vanishing time of flight difference for the linear adaptation with a vanishing axial spacing.

9. The ultrasound flow measurement apparatus in accordance with claim 6, wherein the evaluation unit is configured to determine a compensated time of flight or time of flight difference from the linear adaptation with an axial spacing that corresponds to a mean value of the axial spacings of the measurement paths.

10. The ultrasound flow measurement apparatus in accordance with claim 1, wherein at least four measurement paths are provided.

11. The ultrasound flow measurement apparatus in accordance with claim 1, wherein the ultrasonic transducers are attached to the line from the outside.

12. The ultrasound flow measurement apparatus in accordance with claim 11, wherein a line wall of the line has a plurality of pockets in which a thin-walled region inwardly remains, with the ultrasonic transducers being arranged in a respective pocket and having an oscillating body that couples to the thin-walled region that acts as a membrane of the ultrasonic transducer capable of oscillation.

13. A method of determining the flow rate of a fluid flowing in a line, comprising the steps of:
  transmitting and receiving ultrasonic signals in respective directions with and against a flow of the fluid;
  calculating the flow rate from time of flight differences of the ultrasonic signals along a plurality of measurement paths that are spanned by two respective ultrasonic transducers with the flow therebetween and with a mutual axial spacing in a longitudinal direction of the line, wherein the measurement paths have different axial offsets.

14. The method in accordance with claim 13, wherein the measurements of a time of flight or of a time of flight difference along a measurement path are understood as a sampling point of a function that describes the time of flight or the time of flight difference in dependence on the axial spacing; and wherein the function is reconstructed, approximated, or interpolated from the measurements or a characteristic value of the function is determined.

15. The method in accordance with claim 14, wherein a linear adaptation of the function is carried out.

16. The method in accordance with claim 15, wherein the flow rate is determined from a value of the function at an axial spacing that corresponds to the focus of the axial spacings of the measurement paths.

17. An ultrasound flow measurement apparatus, comprising:
  a plurality of ultrasonic transducers for determining the flow rate of a fluid flowing in a line, the ultrasonic transducers being attached to the line from the outside, wherein a line wall of the line has a plurality of pockets in which a thin-walled region inwardly remains, the plurality of ultrasonic transducers being respectively arranged in the plurality of pockets and each having an oscillating body coupled to the thin-walled region that acts as a membrane of the ultrasonic transducer and is capable of oscillation;

a plurality of measurement paths at which two respective ones of the plurality of ultrasonic transducers are arranged opposite one another with the flow being arranged between said two respective ones of the plurality of ultrasonic transducers and with said two respective ones of the plurality of ultrasonic transducers being arranged at a mutual axial spacing in a longitudinal direction of the line; and an evaluation unit that is configured to calculate the flow rate from time of flight differences of ultrasonic signals along the respective measurement paths in directions with the flow and against the flow, wherein the measurement paths have different axial offsets.

* * * * *